United States Patent Office 3,442,780
Patented May 6, 1969

3,442,780
GRAFTING OF VINYL AROMATIC MONOMERS ONTO POLYCHLOROTRIFLUOROETHYLENE WITH IRRADIATION
Charles A. Levine, Concord, Calif., assignor to The Dow Chemical Company, Midland, Mich., a corporation of Delaware
No Drawing. Filed Sept. 21, 1964, Ser. No. 398,070
Int. Cl. C08f 1/16; B01j 1/10
U.S. Cl. 204—159.17
8 Claims

ABSTRACT OF THE DISCLOSURE

In depth graft copolymerization between a polymer of chlorotrifluoroethylene and a vinyl aromatic monomer is accomplished by diffusing the monomer into the polymer, subjecting the polymer in the presence of the monomer to irradiation and subsequently heating the irradiated polymer/monomer mixture to form the desired graft copolymer.

---

Fluorocarbon copolymer product and process

The present invention relates to novel fluorocarbon graft copolymers and methods for their preparation. More particularly the present invention relates to graft copolymers of polychlorotrifluoroethylene and vinyl aromatic comonomers.

Graft copolymers are generally obtained by activating a previously prepared polymeric material and either simultaneously or subsequently contacting the activated polymer with a vinyl graft comonomer. The activation is of the type capable of causing reaction at the double bond of the vinyl comonomer with the polymer to result in the formation of graft copolymers. In the presence of excess monomer this reaction initiates the polymerization of the comonomer resulting in a graft copolymer being formed. The activation is most generally accomplished by irradiating the polymer to be grafted. To be suitable for the formation of a graft copolymer by this method it is necessary that the initially employed polymer be capable of withstanding the radiation necessary to cause activation. Despite their well-known chemical stability and inertness, it has been established that fluorocarbon polymers such as polychlorotrifluoroethylene rapidly degrade when subjected to radiation. However, even under mild radiation conditions giving rise to limited activation and decreased degradation the resulting products are unsatisfactory in that the grafting which does occur is limited to surface grafting and thus does not give rise to uniform and homogeneous products. The latter result is due to the well-known resistance of fluorocarbon polymers to penetration of the vinyl comonomer and the mildness of the radiation employed which fails to sufficiently activate the fluorocarbon polymer.

It is therefore an object of the present invention to provide a graft copolymer of polychlorotrifluoroethylene and a vinyl aromatic comonomer which contains a high proportion of the vinyl aromatic comonomer grafted onto the polychlorotrifluoroethylene. It is another object of the present invention to obtain a homogeneous graft copolymer of polychlorotrifluoroethylene and a vinyl aromatic comonomer as compared to a surface grafted copolymer. It is still another object of the present invention to produce chemically resistant and high temperature stable graft copolymers of polychlorotrifluoroethylene and vinyl aromatic comonomers which can be converted into ion exchange resins and membranes. Other objects will be apparent hereinafter.

The objects of the present invention are accomplished by contacting polychlorotrifluoroethylene, preferably at elevated temperatures, with an excess of a vinyl aromatic comonomer until penetration of the polychlorotrifluoroethylene has occurred, subjecting the monomer diffused product to high energy radiation of at least $10^4$ rads per second, and thereafter heating the irradiated, comonomer diffused polychlorotrifluoroethylene until the desired degree of grafting is obtained. The resulting product, after washing to remove unreacted comonomer and ungrafted polymeric comonomer, is an "in depth" copolymer of polychlorotrifluoroethylene and the vinyl aromatic comonomer containing in excess of 10 weight percent, based on the polychlorotrifluoroethylene, of reacted comonomer homogeneously distributed throughout the exposed polychlorotrifluoroethylene. The graft copolymer obtained can be further reacted with a sulfonating agent to introduce sulfonic acid groups and result in a cation exchange resin, or with amines to introduce ammonium groups and result in an anion exchange resin.

The polychlorotrifluoroethylene graft copolymers of the present invention are prepared by a three-step process comprising the diffusion of the comonomer into the polychlorotrifluoroethylene, radiation activation of the swollen polychlorotrifluoroethylene and post-radiation heating to effect graft polymerization of the comonomer in situ. The most preferred vinyl aromatic comonomer is styrene, but other vinyl aromatic comonomers such as alpha-chlorostyrene, alpha-methylstyrene, halogen ring substituted styrenes and divinyl benzene are similarly suitable comonomers. In general any monomer containing a

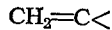

group attached to a benzene nucleus, which is capable of penetrating the polychlorotrifluoroethylene is suitable in forming the graft copolymers of the present invention. The preferred monomers comprise styrene, halogen substituted styrenes and alkyl substituted styrenes wherein the alkyl group contains from one to four carbon atoms. Penetration of an aromatic vinyl monomer can be readily determined by exposing a polychlorotrifluoroethylene film to the comonomer, thereby giving a ready test for screening the suitable vinyl aromatic comonomers. If desirable more than one comonomer may be employed in the process of the present invention.

The diffusion of the comonomer into polychlorotrifluoroethylene is accomplished by contacting the polychlorotrifluoroethylene with excess comonomer. The term "excess" is employed to indicate a quantity of comonomer which is greater than the quantity of comonomer that can be absorbed by the polymer under the conditions employed. The diffusion of the comonomer is generally carried out at temperatures above 40° C. and preferably at temperatures above 80° C. At temperatures below 40° C. the diffusion resistance of the polychlorotrifluoroethylene is too high to allow penetration of any substantial quantities of comonomer within reasonable exposure periods. As the temperature is increased the same quantity of comonomer can be diffused into the polymer in a shorter time interval. Generally the temperatures is not increased beyond 120° C. since at higher temperatures substantial autopolymerization of the styrene occurs. The optimum exposure temperature is at about 100° C. for styrene. In order to insure maximum homogeneity of the resulting graft copolymer it is preferred to continue the exposure to comonomer until the saturation point has been reached. However, depending on the conditions employed, homogeneous graft copolymers can be prepared with as little at 5 weight percent, based on the polychlorotrifluoroethylene, of the comonomer diffused into the fluorocarbon. The diffusion of the comonomer into the polymer is preferably achieved in the absence of any other solvents. Solvents such as $CCl_4$, toluene and $Cl_2CH—CHCl_2$, do not enhance the grafting of the comonomer but may be of use in special circumstances.

The polychlorotrifluoroethylene containing the diffused comonomer is next activated by being exposed to a source of high energy ionizing radiation. "High energy" means that it is of sufficient energy to penetrate an organic substance and produce ionization therein. The particular energy level employed will depend on such considerations as the most economical source available and the thickness of the material to be treated. The radiation generally consists of a beam of high energy particles such as electrons, protons, neutrons, deuterons, alpha particles or beta particles. Alternatively, it may consist of gamma or X-rays. The source of these high energy particles or rays may be a radioactive element which is spontaneously decaying or which is undergoing nuclear fission, as in an atomic pile. More conveniently, it may be a particle accelerator wherein charged particles are accelerated to high energies of the order of 100,000 electron volts or higher but most suitably between about 500,000 to 4,000,000 electron volts, by means of a suitable voltage gradient such as a resonant transformer electron accelerator, a Van de Graaff electron generator, a betatron, a synchrotron, a cyclotron and the like. Neutron radiation may be produced by bombardment of selected light metal (e.g., beryllium) targets with high energy positive particles.

The source and specific nature as well as the strength of the radiation is not critical, as long as it is capable of emitting at least $10^4$ rads per second. (1 rad=100 ergs absorbed per g. of polymer). In general it is preferred to expose the polychlorotrifluoroethylene to 1 to 10 megarads. The total exposure dose above 1 megarad employed in the process of the present invention, although increasing the amount of comonomer grafted has an insignificant overall effect. In view of possible degradation of the copolymer at higher dosages it is in general desirable to employ irradiation dosages within the range set forth above. Since the irradiation is equally effective at room temperature as well as at elevated temperatures it is preferred to employ room temperature to minimize any homopolymerization of the added comonomer.

It is critical to carry out the irradiation only in the presence of the diffused comonomer. In the absence of such, substantial degradation of the polychlorotrifluoroethylene occurs. An excess of the vinyl aromatic monomer need not be employed to prevent the degradation of the polychlorotrifluoroethylene, but is preferably used to ensure maximum protection during the activation step and maximum polymerization during the grafting step.

The irradiation may be carried out in air, the inhibiting effect of oxygen on grafting being low. If desired even this effect can be substantially eliminated by carrying out the irradiation in a nitrogen or other inert atmosphere.

Following irradiation the exposed polymer is subjected to a postactivation heat treatment to effect in situ polymerization and grafting of the resultant polymer. This treatment permits in-depth graft polymerization of the comonomer without substantial degradation of the polychlorotrifluoroethylene. Although grafting can also be obtained at room temperature, the process is extremely slow and thus temperatures in the range of 40°–120° C. are preferred. Temperatures above 120° C. are generally not employed because of the autopolymerization of the comonomer. On obtaining the desired degree of grafting the polymer is washed free of any remaining comonomer.

The resulting product is a homogeneous graft copolymer which contains grafted vinyl aromatic comonomer throughout the polychlorotrifluoroethylene irradiated, and thus is significantly different from surface grafted copolymers. Where as surface grafted copolymers are limited to 3 to 7 percent of grafted comonomer, the graft copolymers of the present invention normally contain from 10 to 80 percent, based on the polychlorotrifluoroethylene, of the grafted vinyl aromatic comonomer.

Surprisingly, it was found that despite the predominantly inert fluorocarbon nature of the resultant graft copolymer, these copolymers are readily reacted with such reagents as sulfuric acid, chlorosulfonic acid, sulfur trioxide to give rise to outstanding cation exchange resins and similarly are capable of being reacted with amines to give rise to outstanding anion exchange resins. The introduction of the ion exchange groups is accomplished by means heretofore developed for such reactions. The outstanding quality of these ion exchange resins is their resistance to chemical and electrochemical degradation.

The invention is further illustrated by the following examples:

Example I

Samples of polychlorotrifluoroethylene film were heated in styrene at 100° C. for a period of 30 minutes. The samples were then removed and placed in a polyethylene bag with fresh styrene. The bag was sealed and subjected to a 2 mev. electron beam of a Van de Graaff electron accelerator at 40 microamperes for 8 megarads. The irradiated samples were heated in fresh styrene to 100° C. for two hours and then washed with methylene dichloride. The resulting samples contained on the average of 34% of styrene grafted to the polychlorotrifluoroethylene.

Example II

The procedure of Example I was repeated except that the styrene was diffused into the polychlorotrifluoroethylene for a period of one hour instead of 30 minutes The resulting samples contained an average of 38% of styrene grafted to the polychlorotrifluoroethylene.

Example III

Using the procedure of Example I, alpha-chlorostyrene is grafted to polychlorotrifluoroethylene.

Example IV

Using the procedure of Example I, alpha-methylstyrene is grafted to polychlorotrifluoroethylene.

Example V

A styrene grafted polychlorotrifluoroethylene membrane, containing greater than 11% by weight of grafted styrene side chains, was treated for 19 hours at 100° C. in concentrated $H_2SO_4$. The product was then washed thoroughly with distilled water until there was no acid in the wash water. Titration of the resulting sulfonic acid groups containing resin showed an ion exchange capacity of 0.75 meq./g.

Example VI

A styrene grafted polychlorotrifluoroethylene containing greater than 20% by weight of grafted styrene side chains was sulfonated overnight in a 1:1 mixture of dichloromethane and chlorosulfonic acid. After thorough washing, titration showed 1.23 meq./g. titratable capacity.

Example VII

A styrene grafted polychlorotrifluoroethylene membrane containing greater than 24 weight percent of polystyrene graft chains was swollen in chloromethyl methylether at room temperature for 2.5 hours. Stannic chloride was added as a catalyst in the ratio of 0.3 mole of $SnCl_4$ per mole of grafted styrene. The mixture was gently agitated at 55° C. for 3.5 hours, and then washed with dioxane.

A 1:1 mixture of dioxane and 25% aqueous trimethyl amine was added to the polymer and the mixture was permitted to stand at room temperature for sixteen hours. After thorough washing, titration showed an anion capacity of 0.94 meq./g. polymer.

The foregoing examples have illustrated the preparation of the graft copolymers of the present invention and their conversion to ion exchange resins. Although the examples have shown the formation of graft copolymers using styrene, alpha-chlorostyrene and alpha-methylstyrene, other vinyl aromatic comonomers can be grafted to polychlorotrifluoroethylene using the illustrated methods. Numerous embodiments of the invention disclosed will be apparent to those skilled in the art and are intended to be included within the scope thereof.

The ion exchange resins of the present invention are of utility in all applications heretofore developed for ion exchange resins and are particularly useful in applications involving corrosive solutions and elevated temperatures.

What is claimed is:

1. A process for preparing polychlorotrifluoroethylene graft copolymers which comprises contacting polychlorotrifluoroethylene with a vinyl aromatic comonomer, until the comonomer has diffused into the polychlorotrifluoroethylene, then subjecting the comonomer diffused polychlorotrifluoroethylene to high energy radiation of at least $10^4$ rads per second and thereafter heating the irradiated comonomer diffused polychlorotrifluoroethylene to a temperature of at least 40° C.

2. The process of claim 1 carried out at temperatures of 40° to 120° C.

3. The process of claim 1 wherein the radiation of the polychlorotrifluoroethylene is carried out in the presence of excess vinyl aromatic comonomer.

4. The process of claim 1 wherein the vinyl aromatic comonomer is a halogen substituted styrene.

5. The process of claim 1 whein the vinyl aromatic monomer is an alkyl substituted styrene wherein the alkyl group contains from one to four carbon atoms.

6. The process of claim 1 wherein the vinyl aromatic monomer is styrene.

7. The process of claim 4 wherein the halogen substituted styrene is alpha-chlorostyrene.

8. The process of claim 5 wherein the alkyl substituted styrene is alpha-methylstyrene.

References Cited

UNITED STATES PATENTS

| 3,257,334 | 6/1966 | Chen et al. | 260—2.1 |
| 3,253,057 | 5/1966 | Landler et al. | 260—877 |
| 3,188,165 | 6/1965 | Magat et al. | 8—115.5 |

OTHER REFERENCES

Chapiro: Radiation Chemistry of Organic Systems, 1962, pp. 676–680.

MURRAY TILLMAN, *Primary Examiner.*

R. B. TURER, *Assistant Examiner.*

U.S. Cl. X.R.

260—884